US012289491B2

United States Patent
Doi (10) Patent No.: US 12,289,491 B2
(45) Date of Patent: Apr. 29, 2025

(54) IMAGE DISPLAY SYSTEM AND METHOD (71) Applicant: KABUSHIKI KAISHA TOSHIBA, Tokyo (JP)

(72) Inventor: Takashi Doi, Fuchu (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 7 days.

(21) Appl. No.: 18/494,810

(22) Filed: Oct. 26, 2023

(65) Prior Publication Data

US 2024/0323480 A1 Sep. 26, 2024

(30) Foreign Application Priority Data

Mar. 22, 2023 (JP) ................... 2023-045544

(51) Int. Cl.
 *H04N 21/4363* (2011.01)
 *H04N 21/436* (2011.01)
(52) U.S. Cl.
 CPC . *H04N 21/43635* (2013.01); *H04N 21/43615* (2013.01)
(58) Field of Classification Search
 CPC ................... H04N 21/43635; H04N 21/43615
 See application file for complete search history.

(56) References Cited

U.S. PATENT DOCUMENTS

| | | | | |
|---|---|---|---|---|
| 2011/0109807 A1* | 5/2011 | Kubo | ............... | H04N 21/44008 348/E5.093 |
| 2016/0241829 A1* | 8/2016 | Qu | ........................ | G09G 5/10 |
| 2017/0188092 A1* | 6/2017 | Lawrence | ........ | H04N 21/43615 |
| 2018/0234637 A1* | 8/2018 | Marino | ..................... | H04N 5/63 |
| 2019/0230318 A1* | 7/2019 | Aggarwal | .............. | G09G 5/006 |
| 2020/0053417 A1* | 2/2020 | Choi | .................... | H04N 21/631 |
| 2020/0404358 A1* | 12/2020 | Lee | .......................... | H04N 5/60 |

FOREIGN PATENT DOCUMENTS

CN 112399243 A * 2/2021 ....... H04N 21/42204

OTHER PUBLICATIONS

CN112399243 English Translation (Year: 2024).*
O'Donnell, "White Paper—HDMI™: The Digital Display Link", Dec. 2006, 21 pages.

* cited by examiner

Primary Examiner — Fernando Alcon
(74) Attorney, Agent, or Firm — Oblon, McClelland, Maier & Neustadt, L.L.P.

(57) ABSTRACT

According to one embodiment, an image display system includes a source device, a sink device, and an HDMI cable that connects the source device and the sink device. The source device includes a transmitter configured to transmit a plurality of pieces of image data via the HDMI cable. The sink device includes a receiver configured to receive the transmitted plurality of pieces of image data, a storage configured to store the received plurality of pieces of image data, and a display controller configured to execute display control processing of repeatedly displaying the plurality of pieces of image data stored in the storage. The transmitter does not transmit image data while the display control processing is being executed.

10 Claims, 6 Drawing Sheets

IMAGE DISPLAY SYSTEM AND METHOD

CROSS-REFERENCE TO RELATED APPLICATIONS

This application is based upon and claims the benefit of priority from Japanese Patent Application No. 2023-045544, filed Mar. 22, 2023, the entire contents of which are incorporated herein by reference.

FIELD

Embodiments described herein relate generally to an image display system and method.

BACKGROUND

In general, there is known an image display system in which a source device (transmission device that transmits image data) and a sink device (reception device that receives image data) are connected by an HDMI (registered trademark) cable.

Meanwhile, in the image display system described above, the image data transmitted from the source device via the HDMI cable is received by the sink device and then displayed in the sink device, but when the image data is displayed in the sink device, the source device needs to continuously transmit the image data to the sink device, and power consumption in the image display system (source device) increases.

DETAILED DESCRIPTION

In general, according to one embodiment, an image display system includes a source device that transmits image data, a sink device that receives the image data, and an HDMI cable that connects the source device and the sink device. The source device includes a transmitter configured to transmit a plurality of pieces of image data via the HDMI cable. The sink device includes a receiver configured to receive the transmitted plurality of pieces of image data, a storage configured to store the received plurality of pieces of image data, and a display controller configured to execute display control processing of repeatedly displaying the plurality of pieces of image data stored in the storage. The transmitter does not transmit image data while the display control processing is being executed.

Various embodiments will be described with reference to the accompanying drawings.

Figure 1:
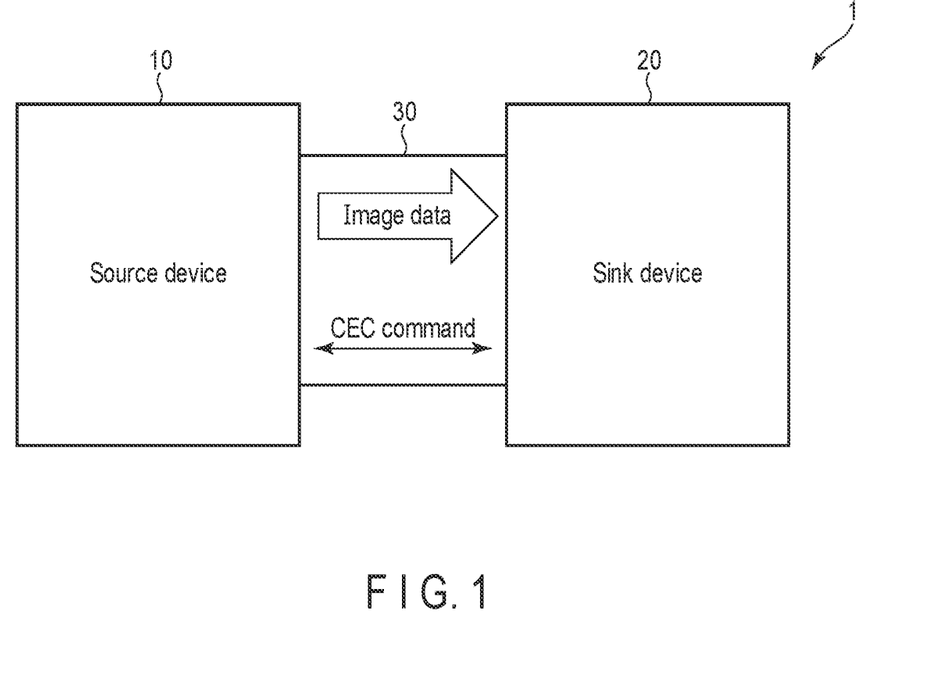
FIG. 1 is a diagram for explaining an outline of an image display system according to an embodiment.

FIG. 1 is a diagram for describing an outline of an image display system according to the present embodiment. An image display system 1 illustrated in FIG. 1 includes a source device 10, a sink device 20, and a high-definition multimedia interface (HDMI) cable 30.

The source device 10 corresponds to a transmission device that transmits (sends) the image data to the sink device 20. The source device 10 includes, for example, a recorder, an optical disc player, a set top box, a video camera, a personal computer, a smartphone, and the like.

The sink device 20 corresponds to a reception device that receives the image data transmitted from the source device 10, and is configured to display the received image data. The sink device 20 includes, for example, a television (television receiver), a monitor, a projector, a personal computer, a smartphone, a digital signage, and the like.

The HDMI cable 30 is a cable conforming to a video interface standard called HDMI, and connects the source device 10 and the sink device 20. The source device 10 can transmit the image data to the sink device 20 via the HDMI cable 30, and the sink device 20 can receive the image data transmitted from the source device 10 via the HDMI cable 30.

Furthermore, the source device 10 and the sink device 20 connected by the HDMI cable 30 can transmit and receive a consumer electronics control (CEC command). The CEC command corresponds to a control signal for realizing a link function between the source device 10 and the sink device 20.

Note that the image data in the present embodiment may be still image data or moving image data (video data). Furthermore, in the present embodiment, it is mainly described that the image data is transmitted from the source device 10 to the sink device 20, but audio data may be added to the image data.

Here, in the image display system 1 described above, the image data (For example, a still image) transmitted from the source device 10 via the HDMI cable 30 is displayed on the sink device 20, but when the image data is displayed on the sink device 20, the source device 10 needs to continuously transmit the image data to the sink device 20. In such a configuration, power consumption in the image display system 1 (source device 10) increases.

Incidentally, for example, a signage system using a digital signage (a large display panel or the like) as the sink device 20 is generally used to transmit information, and in such a signage system, a plurality of still images (data) is often repeatedly displayed in order to perform reliable information notification.

In the present embodiment, assuming that the image display system 1 is, for example, the signage system described above, a mechanism for realizing power saving in the image display system 1 is provided.

Figure 2:
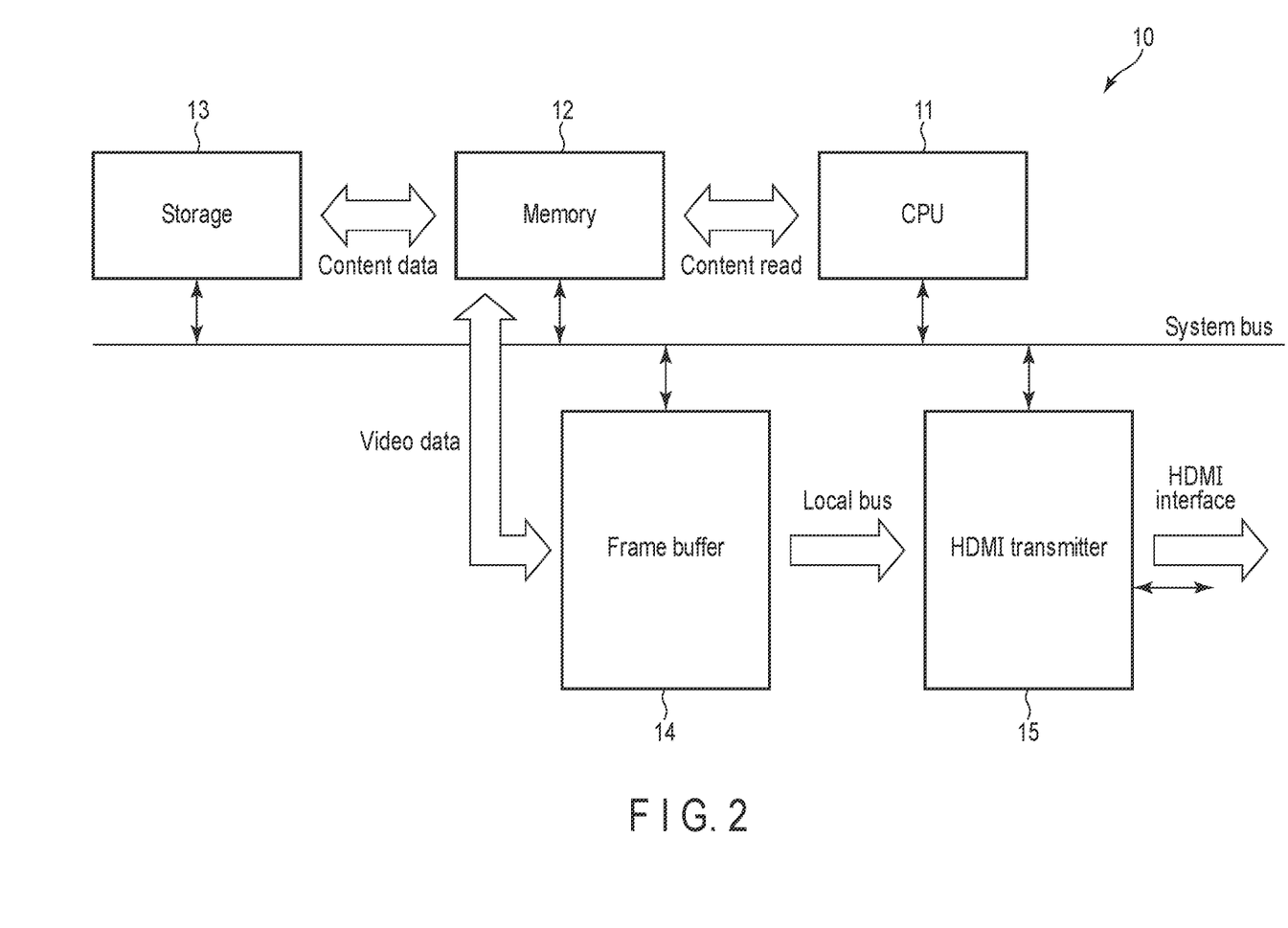
FIG. 2 is a diagram illustrating an example of a configuration of a source device.

FIG. 2 illustrates an example of a configuration of the source device 10 illustrated in FIG. 1. As illustrated in FIG. 1, the source device 10 includes a CPU 11, a memory 12, a storage 13, a frame buffer 14, and an HDMI transmitter 15.

The CPU 11 is a processor for controlling the operation of each component in the source device 10. The memory 12 is a main storage device such as a random access memory (RAN). The storage 13 is an auxiliary storage device such as a hard disk drive (HDD) or a solid state drive (SSD). The frame buffer 14 has a storage area for temporarily holding data. The HDMI transmitter 15 is configured to transmit image data via the HDMI cable 30 (HDMI interface). Further, the HDMI transmitter 15 has a function of transmitting and receiving the above-described CEC command.

The CPU 11, the memory 12, the storage 13, the frame buffer 14, and the HDMI transmitter 15 are connected via a system bus, and the frame buffer 14 and the HDMI transmitter 15 are connected via a local bus.

Note that the source device 10 according to the present embodiment operates to transmit a plurality of pieces of image data (video data) based on content data stored in the storage 13 from the HDMI transmitter 15 to the sink device 20, for example. A detailed operation of the source device 10 will be described later.

Figure 3:
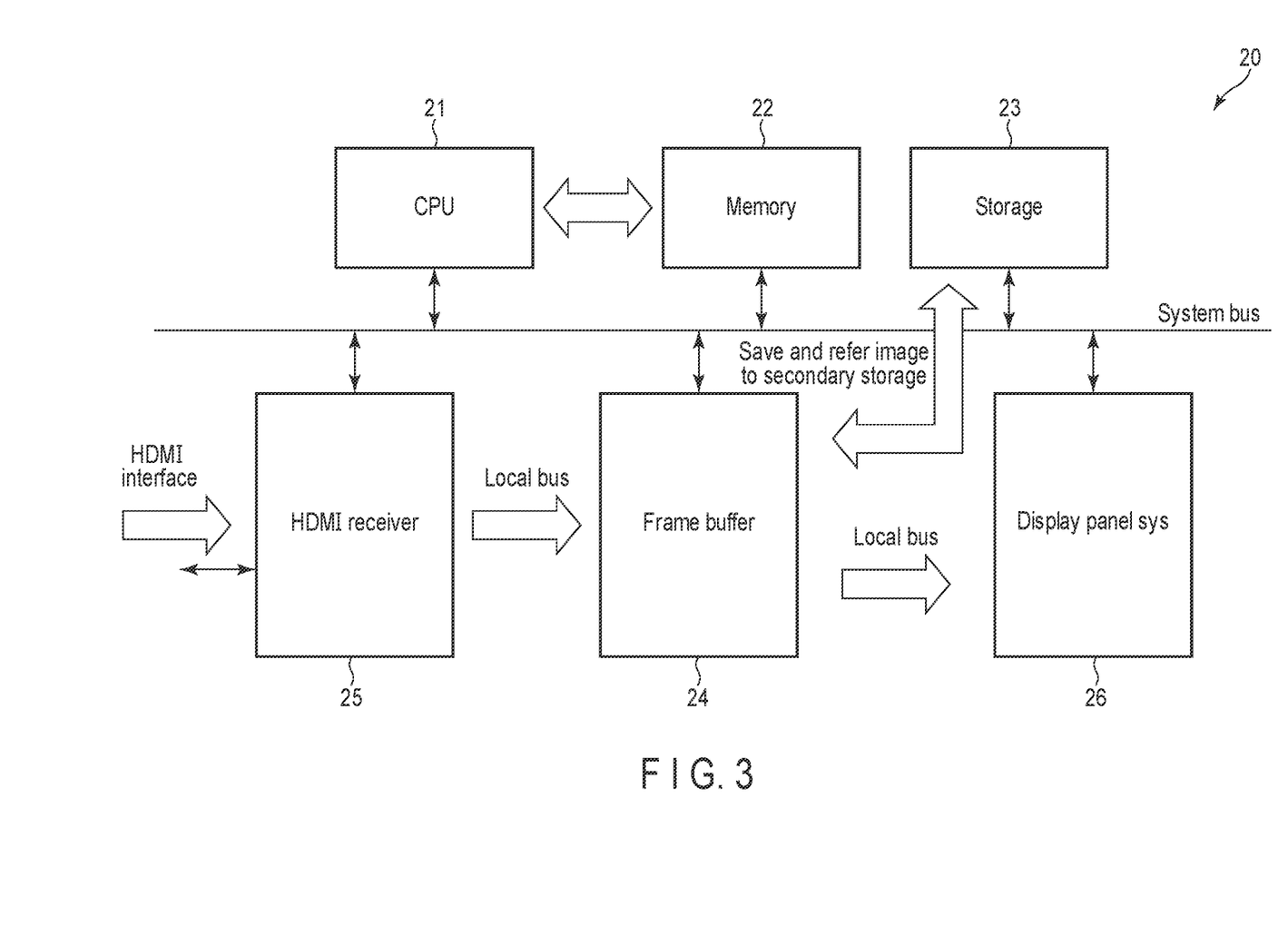
FIG. 3 is a diagram illustrating an example of the configuration of the sink device.

FIG. 3 illustrates an example of a configuration of the sink device 20 illustrated in FIG. 1. As illustrated in FIG. 2, the sink device 20 includes a CPU 21, a memory 22, a storage 23, a frame buffer 24, an HDMI receiver 25, and a display panel sys 26.

The CPU 21 is a processor for controlling the operation of each component in the sink device 20. The memory 22 is, for example, a main storage device such as a RAM. The storage 23 is an auxiliary storage device (secondary storage device) such as an HDD or an SSD. The frame buffer 24 has a storage area for temporarily holding data. The HDMI receiver 25 is configured to receive image data via the HDMI cable 30 (HDMI interface). Further, the HDMI transmitter 15 has a function of transmitting and receiving the above-described CEC command. The display panel sys 26 includes a display panel that displays image data and a controller (display controller) that controls display of the image data.

The CPU 21, the memory 22, the storage 23, the frame buffer 24, the HDMI receiver 25, and the display panel sys 26 described above are connected via the system bus, but the HDMI receiver 25 and the frame buffer 24 may be connected via a local bus, and the frame buffer 24 and the display panel sys 26 may be connected via a local bus.

Note that the sink device 20 according to the present embodiment operates to store, for example, a plurality of pieces of image data received by the HDMI receiver 25 in the storage 23 and display the plurality of pieces of image data stored in the storage 23 on the display panel sys 26, and a detailed operation of the sink device 20 will be described later.

Hereinafter, the operation of the image display system 1 according to the present embodiment will be described. Here, processing (hereinafter, referred to as image saving processing) for saving the plurality of pieces of image data transmitted from the source device 10 via the HDMI cable 30 in the sink device 20 and processing (hereinafter, referred to as image display processing) for displaying the plurality of pieces of saved image data in the sink device 20 will be described.

Figure 4:
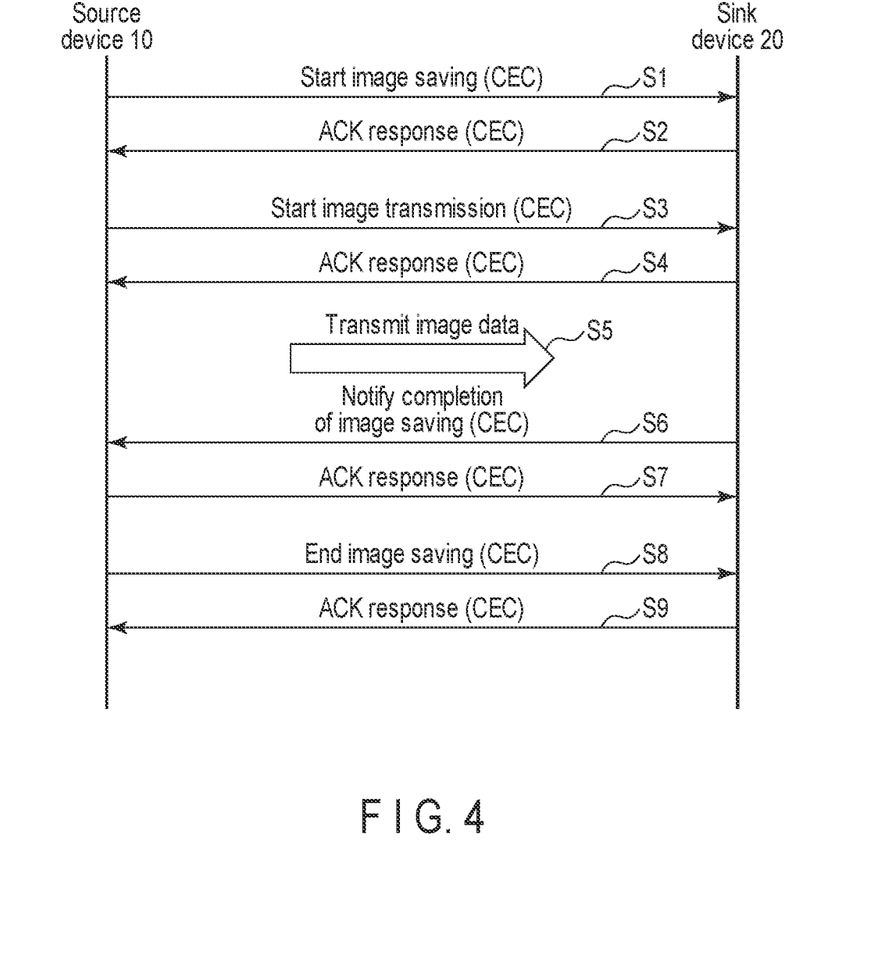
FIG. 4 is a sequence chart showing an example of a processing procedure of image saving processing.

First, an example of a processing procedure of the above-described image saving processing will be described with reference to the sequence chart of FIG. 4.

In a case where the image saving processing is executed, the source device 10 notifies the sink device 20 of start of saving of the image data, for example, according to operation of a user who uses the source device 10 (Step S1).

When the processing in Step S1 is executed, the sink device 20 transmits an ACK response to the notification in Step S1 to the source device 10 (Step S2).

Upon receiving the ACK response transmitted in Step S2, the source device 10 notifies the sink device 20 of the start of transmission of the image data (Step S3).

When the processing in Step S3 is executed, the sink device 20 transmits an ACK response to the notification in Step S3 to the source device 10 (Step S4).

Upon receiving the ACK response transmitted in Step S4, the source device 10 starts transmission of the image data. In this case, the source device 10 acquires, for example, image data designated by the user who uses the source device 10 from the storage 13, and transmits the acquired image data to the sink device 20 (Step S5). In Step S5, the image data is transmitted from the HDMI transmitter 15 to the sink device 20 via a lane for transmitting the image data of the HDMI cable 30.

Note that, although the image data stored in the storage 13 is assumed to be transmitted here for convenience, in Step S5, for example, content data stored in the storage may be arranged in the memory 12, and image data (video data) generated by executing predetermined processing related to content read or the like on the content data arranged in the memory 12 may be transmitted.

When receiving the image data transmitted in Step S5, the sink device 20 stores (saves) the received image data in the storage 23. Note that the image data may be temporarily held in the frame buffer 24 before being stored in the storage 13.

When the image data is stored in the storage 23, the sink device 20 notifies the source device 10 of the completion of the saving of the image data (Step S6).

When the processing in Step S6 is executed, the source device 10 transmits an ACK response to the notification in Step S6 to the sink device 20 (Step S7).

In the present embodiment, it is assumed that a plurality of pieces of image data is designated by the user using the source device 10, and the processing in Steps S5 to S7 described above is repeatedly executed for each of the plurality of pieces of image data. Note that, in a case where the processing in Steps S5 to S7 is repeatedly executed for each of the plurality of pieces of image data, the image data may be temporarily held in the frame buffer 14 and then transmitted from the HDMI transmitter 15.

In a case where all of the plurality of pieces of image data designated by the user are transmitted from the source device 10 to the sink device 20 as described above, the source device 10 notifies the sink device 20 of the end of saving of the image data (Step S8).

When the processing of Step S8 is executed, the sink device 20 transmits an ACK response to the instruction in Step S8 to the source device 10 (Step S9).

Note that the processing in Steps S1 to S4 and S6 to S9 described above is executed using the CEC command transmitted and received via the HDMI cable 30.

Furthermore, in the image saving processing described above, the image data transmitted in Step S5 is stored in the storage 23 of the sink device 20, but the image data may be stored in the storage 23 after being subjected to, for example, compression processing.

Next, an example of a processing procedure of the above-described image display processing will be described with reference to the sequence chart of FIG. 5.

In a case where the image display processing is executed, the source device 10 instructs start of display of image data, for example, according to the operation of the user who uses the source device 10 (Step S11).

When the processing of Step S11 is executed, the sink device 20 transmits the ACK response to the instruction in Step S11 to the source device 10 (Step S12).

Next, the sink device 20 starts display control processing of displaying (reading) a plurality of pieces of image data stored (saved) in the storage 23 by executing the image saving processing described above.

Hereinafter, the display control processing will be described. In the present embodiment, the display control information used for the display control processing is held in the sink device 20 (display panel sys 26). It is assumed that the display control information is generated according to an operation of a user who uses the source device 10, for example, and is transmitted from the source device 10 to the sink device 20 using the CEC command described above.

The display control information includes, for example, image number information, display interval information, display order information, and transition information.

The image number information is information for instructing an image to be displayed on the sink device 20 (display panel sys 26) among a plurality of pieces of image data stored in the storage 23. Different numbers are assigned to the plurality of pieces of image data stored in the storage 23, and the image number information includes, for example, a start number and an end number. According to such image number information, it is possible to instruct to display a plurality of pieces of image data (that is, a plurality of pieces of image data having consecutive numbers) to which each of a plurality of corresponding numbers is allocated between the start number and the end number. The image number information may be information including a plurality of numbers and instructing to display a plurality of pieces of image data (that is, a plurality of pieces of image data of which numbers are not continuous) to which each of the plurality of numbers is allocated.

The display interval information is information for instructing a time interval at which each of the plurality of pieces of image data instructed to be displayed by the image number information is displayed. In the display interval information, for example, a time interval in units of msec can be indicated.

The display order information is information for instructing the order of displaying the plurality of pieces of image data instructed to be displayed by the image number information. In the display order information, for example, a first order of displaying a plurality of pieces of image data in ascending order of the number assigned to the image data, a second order of displaying a plurality of pieces of data in descending order of the number assigned to the image data, a third order of randomly displaying the plurality of pieces of image data, or the like is instructed.

The transition information is information for instructing a transition (effect) to be applied when displaying a plurality of pieces of image data instructed to be displayed by the image number information. In the transition information, for example, wipe, slide, zoom, white in, white out, and the like are instructed as the transition.

In the display control processing, the controller included in the display panel sys 26 acquires a plurality of pieces of image data from the storage 23 based on the image number information included in the display control information, and displays the plurality of pieces of acquired image data on a display panel included in the display panel sys 26, based on the display interval information, the display order information, and the transition information included in the display control information. In this case, the plurality of pieces of image data acquired from the storage 23 may be temporarily held in the frame buffer 24 and sequentially processed by the display panel sys 26.

In the above description, the image number information is included in the display control information. However, for example, when all the plurality of pieces of image data stored in the storage 23 are displayed, the image number information may be omitted.

Although the display control information includes the display interval information, the display order information, and the transition information, some of the display interval information, the display order information, and the transition information may be omitted.

Further, the display control information may include cover information and back cover information. The cover information is information for instructing (the number assigned to) the image data to be first displayed in the display control processing and a display period of the image data. The back cover information is information for instructing (the number assigned to) the last image data displayed in the display control processing and the display period of the image data.

When image data subjected to compression processing is stored in the storage 23 as described above, the image data may be displayed after expansion (decompression) processing is performed.

Here, in the present embodiment, the above-described display control processing is repeatedly executed (that is, a plurality of pieces of image data are repeatedly displayed based on the display control information). When ending such display control processing, the source device 10 instructs stop of display of the image data, for example, according to operation of the user who uses the source device 10 (Step S13).

When the processing of Step S13 is executed, the sink device 20 transmits an ACK response to the instruction in Step S13 to the source device 10 (Step S14).

In this case, the sink device 20 ends the display control processing described above, and notifies the source device 10 that the display control processing has ended (Step S15).

When the processing in Step S15 is executed, the source device 10 transmits an ACK response to the notification in Step S15 to the sink device 20 (Step S16).

Note that the processing in Steps S11 to S16 described above is executed using the CEC command transmitted and received via the HDMI cable 30.

Furthermore, in the image display processing in the present embodiment, the source device 10 operates not to transmit image data while the display control processing is being executed in the sink device 20. In this case, for example, the source device 10 may stop the power supply to the HDMI transmitter 15 after the display control processing is started, or may turn off the power of the source device 10.

Figure 5:
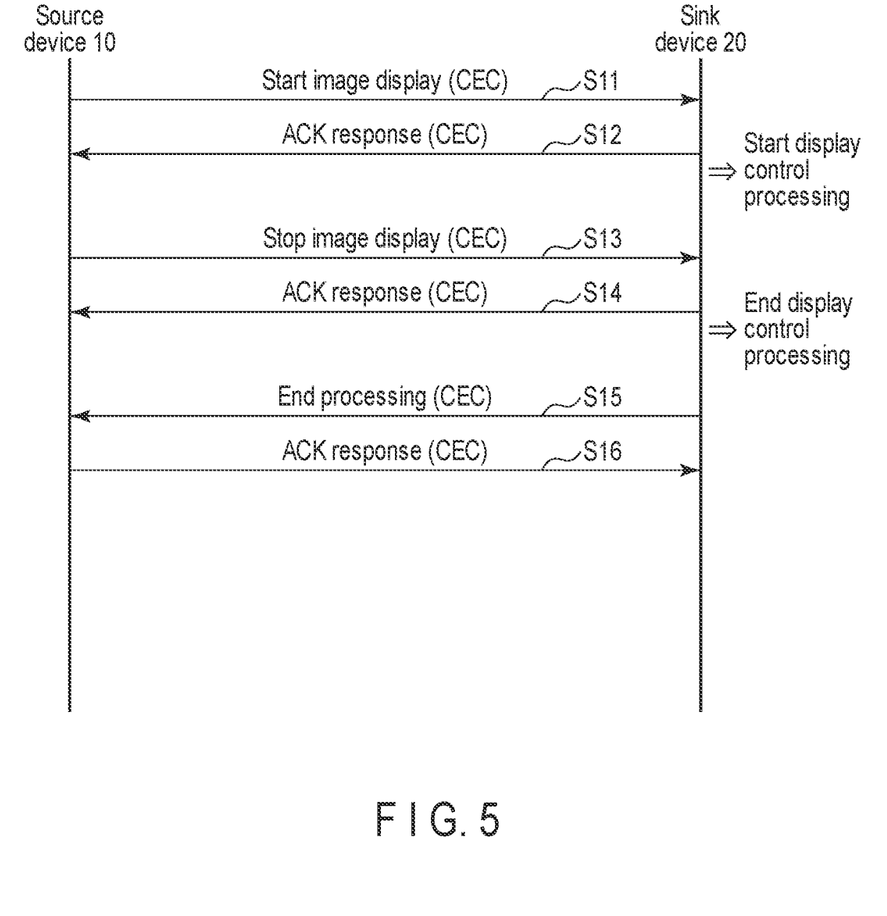
FIG. 5 is a sequence chart illustrating an example of a processing procedure of image display processing.

Furthermore, in FIG. 5, it has been described that the processing of Steps S11 to S16 is executed, but after the processing of Steps S11 to S16 is executed, processing of requesting the sink device 20 from the source device 10 to refer to the end status related to the display control processing may be executed. According to such processing, (the user who uses) the source device 10 can confirm whether or not the display control processing has been normally ended.

Here, in the present embodiment, the display control information is generated in the source device 10 (that is, the display control processing is executed in response to an instruction from the source device 10), but the display control information can be changed according to the instruction from the source device 10.

Figure 6:
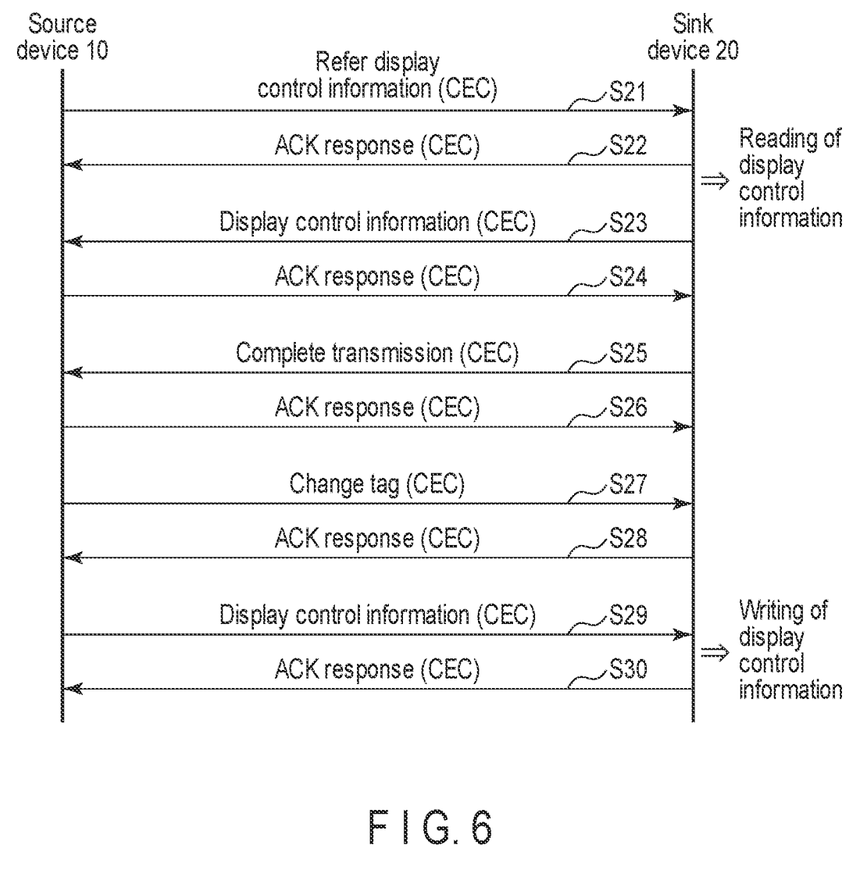
FIG. 6 is a sequence chart illustrating an example of a processing procedure of processing of changing display control information.

Hereinafter, an example of the processing procedure of the processing of changing the display control information will be described with reference to the sequence chart of FIG. 6.

First, the source device 10 instructs reference to the display control information, for example, according to the operation of the user who uses the source device 10 (Step S21).

When the processing of Step S21 is executed, the sink device 20 transmits an ACK response to the instruction in Step S21 to the source device 10 (Step S22).

Next, the sink device 20 reads the display control information held in the sink device 20 (display panel sys 26). The display control information read in this manner is transmitted to the source device 10 (Step S23).

When the processing of Step S23 is executed, the source device 10 transmits an ACK response to the display control information transmitted in Step S23 to the sink device 20 (Step S24).

Note that the processing in Step S23 is executed using the CEC command, but the amount of data (the number of bytes) that can be transmitted using the CEC command is limited, and thus the display control information is divided and transmitted. That is, Steps S23 and S24 described above are repeatedly executed until all the divided pieces of display control information are transmitted.

In a case where all the display control information has been transmitted, the sink device 20 notifies the source device 10 that the transmission of the display control information has been completed (Step S25).

When the processing in Step S25 is executed, the source device 10 transmits an ACK response to the notification in Step S25 to the sink device 20 (Step S26).

Here, the user who uses the source device 10 can refer to the display control information transmitted from the sink device 20 in Step S23 described above and perform an operation of changing at least a part (for example, image number information, display interval information, display order information, transition information, or the like) of the display control information.

In this case, the source device 10 transmits a tag (hereinafter, referred to as a change tag) indicating a changed portion of the display control information to the sink device 20 (Step S27).

When the processing of Step S27 is executed, the sink device 20 transmits an ACK response to the change tag transmitted in Step S27 to the source device 10 (Step S28).

Next, the source device 10 transmits the display control information changed as described above to the sink device 20 (Step S29). In this case, the source device 10 can reduce a communication amount by transmitting only the changed portion of the display control information.

The sink device 20 writes (the changed portion of) the display control information transmitted in Step S29 into a portion indicated by the change tag transmitted in Step S27 in the display control information held in the sink device 20 (display panel sys 26).

When the writing of the display control information is completed as described above, the sink device 20 transmits an ACK response to the source device 10 (Step S30).

As described above, in the present embodiment, the source device 10 transmits a plurality of pieces of image data via the HDMI cable 30, and the sink device 20 receives the plurality of pieces of image data transmitted from the source device 10 and stores the received plurality of pieces of image data in the storage 23. Furthermore, in the present embodiment, the sink device 20 executes the display control processing of repeatedly displaying a plurality of pieces of image data stored in the storage 23, and the source device 10 does not transmit image data while the display control processing is being executed.

In the present embodiment, with such a configuration, since the source device 10 does not need to continue to transmit image data displayed on the sink device 20 (display panel sys 26) to the sink device 20, it is possible to achieve power saving in the image display system 1 (source device 10).

Note that, in the present embodiment, display control processing is executed based on display control information (information for controlling display of a plurality of pieces of image data) generated in the source device 10. In addition, the display control information includes at least one of the display interval information for instructing the interval at which each of the plurality of pieces of image data is displayed, the display order information for instructing the order in which each of the plurality of pieces of image data is displayed, and the transition information for instructing the transition applied when each of the plurality of pieces of image data is displayed. Furthermore, the display control information can be changed based on the instruction from the source device 10. In the present embodiment, with such a configuration, the plurality of pieces of image data stored in the storage 23 can be displayed in a mode desired by the user using the source device 10.

Furthermore, in the present embodiment, the sink device 20 starts display of the plurality of pieces of data based on the instruction from the source device 10, but the source device 10 can stop operation (for example, power supply to HDMI transmitter 15 is stopped, or power supply to source device 10 is turned off) after the display control processing by the sink device 20 (display panel sys 26) is started. According to such a configuration, the power consumption in the source device 10 can be further reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image display system comprising a source device that transmits image data, a sink device that receives the image data, and an HDMI cable that connects the source device and the sink device, wherein
    the source device includes a transmitter configured to transmit a plurality of pieces of image data via the HDMI cable,
    the sink device includes:
        a receiver configured to receive the transmitted plurality of pieces of image data;
        a storage configured to store the received plurality of pieces of image data; and
        a display controller configured to execute display control processing of repeatedly displaying a plurality of pieces of image data stored in the storage, and
    the transmitter does not transmit image data while the display control processing is being executed.

2. The image display system according to claim 1, wherein
    the display controller is configured to execute the display control processing based on display control information for controlling display of the plurality of pieces of image data, and
    the display control information is generated in the source device.

3. The image display system according to claim 2, wherein the display control information includes at least one of display interval information for instructing an interval at which each of the plurality of pieces of image data is displayed, display order information for instructing an order in which each of the plurality of pieces of image data is displayed, and transition information for instructing a transition applied when each of the plurality of pieces of image data is displayed.

4. The image display system according to claim 2, wherein the display control information is changed based on an instruction from the source device.

5. The image display system according to claim 1, wherein
the display controller is configured to start the display control processing based on an instruction from the source device, and
the source device is configured to stop operation after the display control processing is started.

6. An image display method executed by an image display system comprising a source device that transmits image data, a sink device that receives the image data, and an HDMI cable that connects the source device and the sink device, the image display method comprising:
transmitting, by the source device, a plurality of pieces of image data via the HDMI cable;
receiving, by the sink device, the transmitted plurality of pieces of image data;
storing, by the sink device, the received plurality of pieces of image data in a storage; and
executing, by the sink device, display control processing of repeatedly displaying a plurality of pieces of image data stored in the storage, wherein
the source device does not transmit image data while the display control processing is being executed.

7. The image display method according to claim 6, wherein
the executing of the display control processing includes executing the display control processing based on display control information for controlling display of the plurality of pieces of image data, and
the display control information is generated in the source device.

8. The image display method according to claim 7, wherein the display control information includes at least one of display interval information for instructing an interval at which each of the plurality of pieces of image data is displayed, display order information for instructing an order in which each of the plurality of pieces of image data is displayed, and transition information for instructing a transition applied when each of the plurality of pieces of image data is displayed.

9. The image display method according to claim 7, wherein the display control information is changed based on an instruction from the source device.

10. The image display method according to claim 6, wherein
the executing of the display control processing includes starting the display control processing based on an instruction from the source device, and
the source device is configured to stop operation after the display control processing is started.

* * * * *